(12) United States Patent
Borlik (10) Patent No.: US 8,112,919 B2
(45) Date of Patent: Feb. 14, 2012

(54) METHOD FOR REMOVING AND RETURNING ITEMS TO THE ORIGINAL LOCATION

(76) Inventor: Steven R. Borlik, Los Altos, CA (US)

( * ) Notice: Subject to any disclaimer, the term of this patent is extended or adjusted under 35 U.S.C. 154(b) by 364 days.

(21) Appl. No.: 12/586,894

(22) Filed: Sep. 29, 2009

(65) Prior Publication Data

US 2011/0078094 A1    Mar. 31, 2011

(51) Int. Cl.
B42F 21/00    (2006.01)

(52) U.S. Cl. .............. 40/359; 40/371; 229/67.2; D19/90

(58) Field of Classification Search .................... 40/380, 40/359, 371; 229/67.1, 67.2; D19/90
See application file for complete search history.

(56) References Cited

U.S. PATENT DOCUMENTS

| | | | | |
|---|---|---|---|---|
| 1,192,719 A * | 7/1916 | Wells | ............ | 254/104 |
| 2,098,394 A * | 11/1937 | Lane | ............ | 40/380 |
| 2,657,692 A * | 11/1953 | Dahl | ............ | 40/380 |
| 5,676,439 A * | 10/1997 | Occhipinti et al. | ............ | 312/183 |
| 5,836,098 A * | 11/1998 | Carney | ............ | 40/666 |
| 6,354,027 B1 * | 3/2002 | Cummings | ............ | 40/359 |

* cited by examiner

*Primary Examiner* — Gary Hoge
(74) *Attorney, Agent, or Firm* — Hung Ban Tran (57) ABSTRACT

A method of removing and returning a file folder or folders to the original location or locations is provided.

15 Claims, 8 Drawing Sheets

METHOD FOR REMOVING AND RETURNING ITEMS TO THE ORIGINAL LOCATION

BACKGROUND

The invention relates to a method for removing, place holding, identifying, locating and returning items including file folders and the file contents to the original location within a top or side tab filing cabinet, file container, bin, or shelf storage system.

File organization, indexing, adjustability, ease of use, scalability and expandability are everyday problems that many people have spent many years trying to solve. A great deal of innovation can be seen in this area of document filing. Attempts have been made to solve lack of visibility behind file tabs, clear location and tracking of files removed from their place, adjustability and expandability of the file collection, as well as simple visible index guides to direct people to proper filing locations.

In conventional filing, when you pull a file from a cabinet (SA), you do not always mark the location, so returning it takes filing time and effort. Also, there is no indication that a file has been removed, and when one file is missing, it might be signed out, or it might be misfiled. Currently, "out-guides" are available for the purpose of identifying removed file locations by means of sign-out forms. This distinguishes files that are signed out from those that are just in the wrong place (or missing). Available out-guides have the disadvantage of being cumbersome to properly fill out. Further, out-guide sets have fixed tabs that are often all in the same place. Individual out-guides within a given set are usually identical and most out-guides must be disposed of after use.

It is an important and difficult task to properly place a file folder back to it original location so that a next user can easily locate it and use it. Often, a file folder was urgently needed, the user rushed to full the file folder from a file cabinet or a shelf, diligently worked on a project using that file folder and neglected to put the file folder back to its original location. It would be very difficult for a next user to find the file folder. In the worst scenario, the file folder was left on the desk for weeks and a finder of that file folder would not know where to put it back to the original location.

A lot of time can be spent looking for a file folder if it is misplaced within a file cabinet. A project could be delayed or damages could be incurred if important file folders are lost. There is a need to develop a method or a process, where a removed file folder can be easily found and put back to its original location.

This invention is a device (and a method) used to mark locations of file folders as they are removed from a cabinet. The first marker (in the cabinet) holds the place and designates that the file is "signed out". The second marker designates the file and also is used as a bookmark for any item removed from the folder. This way you can keep your files closed, and your stuff in order. Everything has a place, and that place is marked so it can be easily found.

This invention is a method which can be used to satisfy all these requirements of adjustability, visibility, file tracking, re-filing, indexing, out guiding and book marking within individual files and entire file systems.

It is also an object of this invention to provide a method for removing a file folder from a cabinet using a dual marker system, where a first marker is placed in the file cabinet and a second marker is placed in the removed file folder. Matching the first marker in the file cabinet to the second identical marker in the file folder, a user can easily put the file folder back to it original location and then remove both file markers from the file cabinet and the file folders.

It is a further object of this invention to provide a method for removing a file folder from a file cabinet, finding the removed the file folder and returning it to the original location by using a dual marker system, where a set of dual markers has its own unique color or pattern.

It is a further object of this invention to a method for removing a file folder from a file cabinet, finding the removed file folder, and returning it to the original location by using a dual marker system, where each set of dual markers has at least two distinguishing marks.

It is a further object of this invention to a method for removing a file folder from a file cabinet, finding the removed file folder, and returning it to the original location by using a dual marker system, where each set of dual markers has at least two distinguishing marks and is colored.

It is a further object of this invention to provide folder bookmarking of documents removed and replaced from the folder in a similar fashion.

DETAILED DESCRIPTION OF THE INVENTION

Figure 1A:
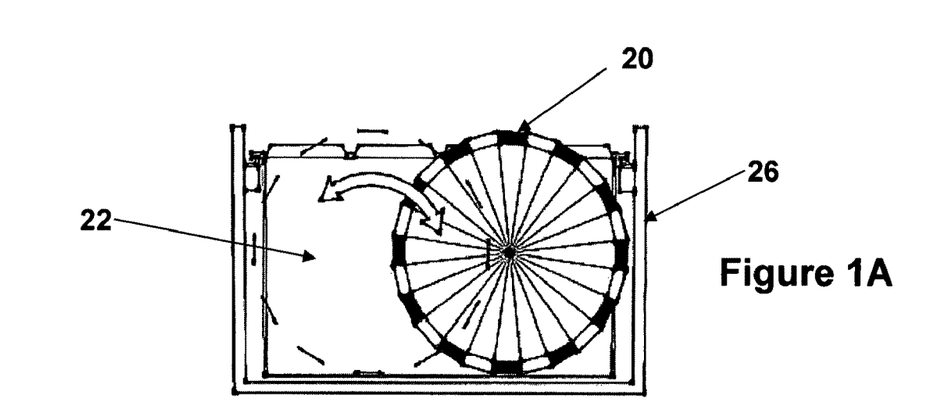
FIG. 1A shows a marker inside a file container.
Figure 1B:
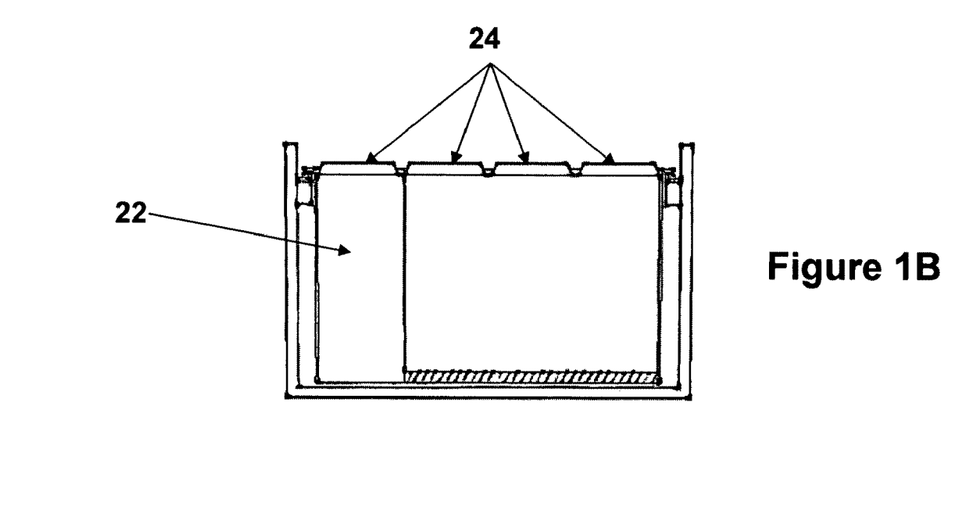
FIG. 1B shows the file folders and the tabs of the file folders.

The invention relates to a marker 20A as shown in FIG. 1A preferably circular in shape being inserted into a file cabinet where a file folder 22 is being removed. The marker 20A left in the file cabinet 26 serves as a reminder that a file folder 22 has been removed. The marker 20A also indicates the exact location where the file folder should be returned. The diameter of the marker 20A is sized such that it is tall enough to be seen behind other tabs 24 of other folders as shown in FIG. 1B, but short enough that the file container 26 of the file cabinet 28 can be closed. The dimension of the marker 20A is tall enough that the matched pair 20A and 20B can be pinched between the fingers and removed without trapping the file contents, but short enough that it does not pose a cumbersome interference to viewing or handling file folders or tabs or file contents. The markers 20A with its circular shape when left in the file folder 22 or the file container 26 can easily roll around inside the file folder 22 or the file container 26, respectively, when pushes by a user. The marker 20A and the matching marker 20B are identical in every aspect.

Figure 2:
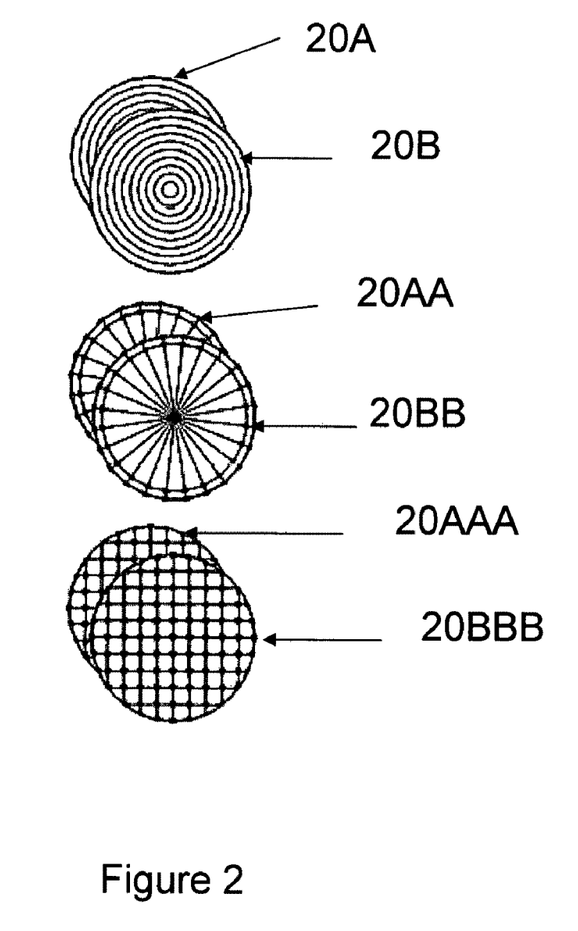
FIG. 2 shows an example of three sets of markers in a limitless series comprising three markers and their matching markers.

Another way to return the removed file folders 22 to their original locations is to use a set of two markers with same features for one folder. Three sets of markers are shown in FIG. 2. A set of two markers 20A and 20B is used for a file folder being removed. A second set of two markers 20AA and 20BB is used for a second file folder being removed. A third set of two markers 20AAA and 20BBB is used for a third file folder being removed.

Figure 3A:
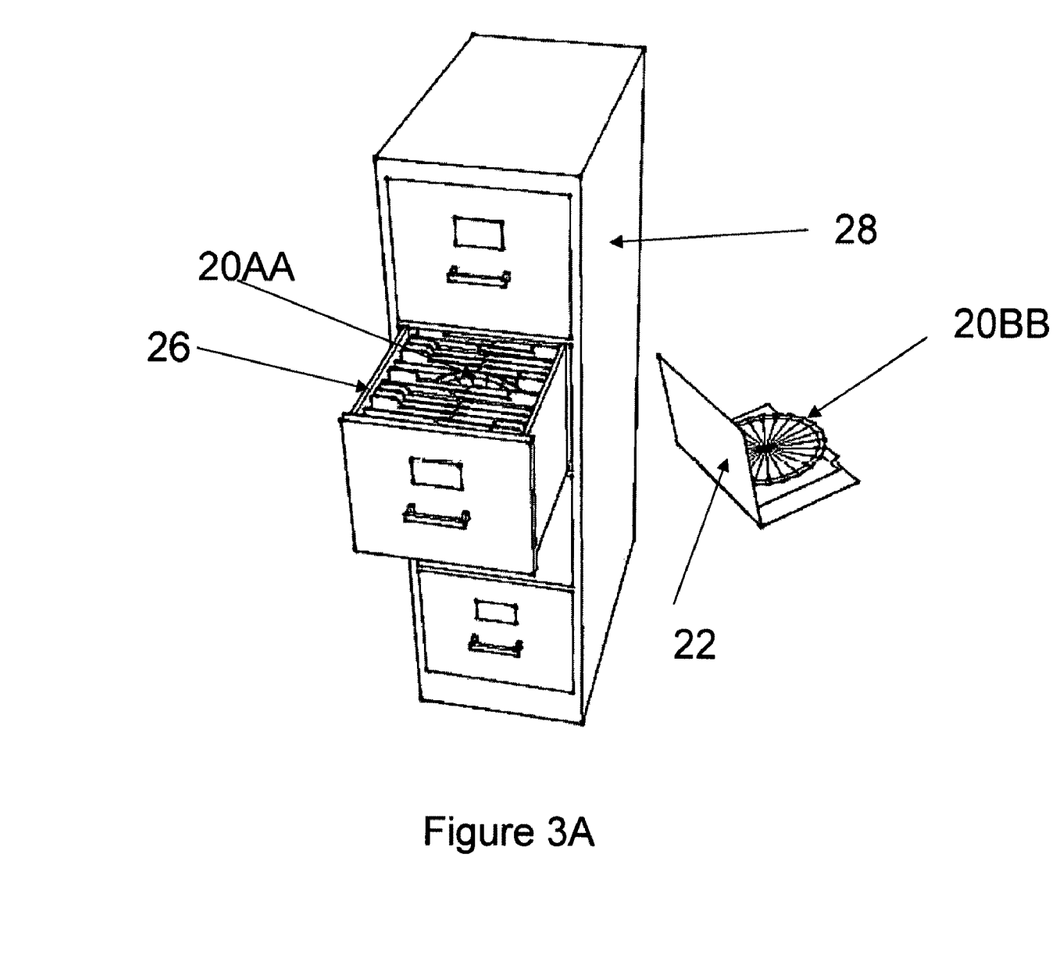
FIG. 3A shows a marker being placed inside a file container, and a matching marker being placed inside a folder being removed.
Figure 3B:
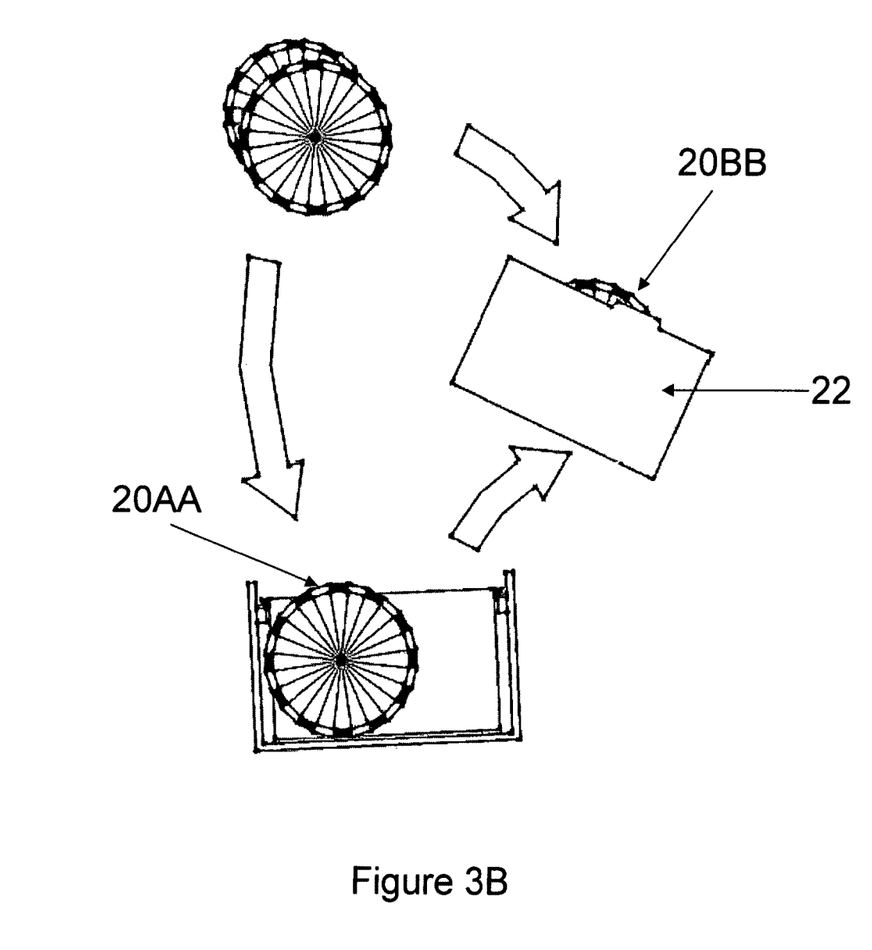
FIG. 3B is shows a detailed picture of a marker being placed inside a file container and a matching marker being placed inside a file folder being removed from the shelves.
Figure 4:
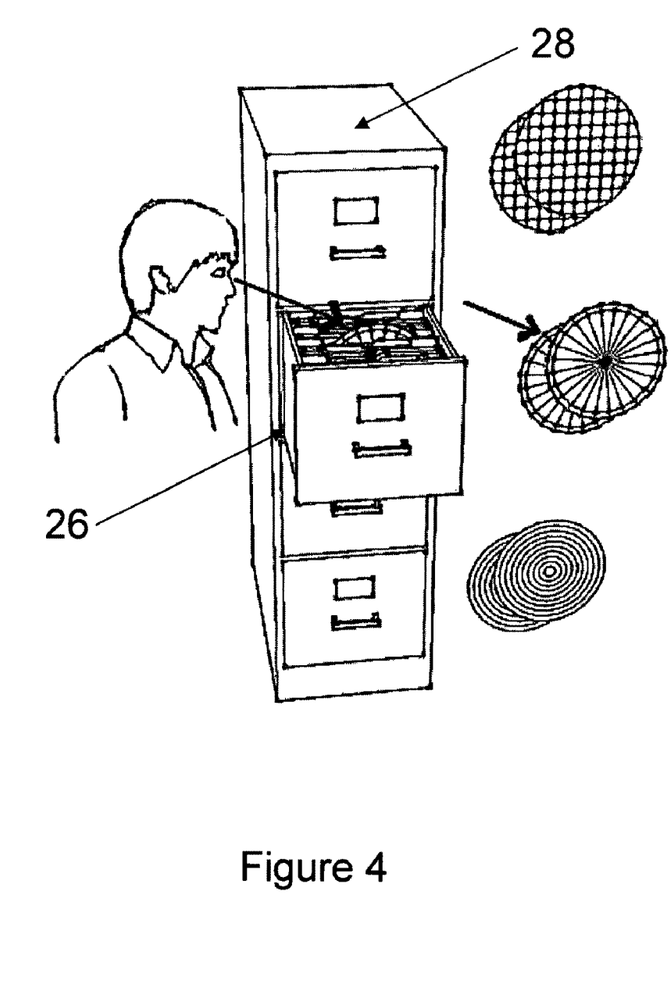
FIG. 4 shows a person can easily detect the marker indicating that a file folder has been removed.

When a file folder 22 is removed as shown in FIG. 3, a marker 20AA is left inside the file container 26 where the file folder 22 was situated. The circular shape of the marker 20AA allows it to roll around the file container easily. The marker 22BB is inserted inside the removed file folder 22. After an extended period of usage of the removed file folder 22, a user will go back to the file cabinet 28, look into different file containers as shown in FIG. 4. When the user finds the matching marker 20BB, put the file folder 22 back into the file container 26, and remove 20AA and 20BB markers for usage at a later time.

Figure 5:
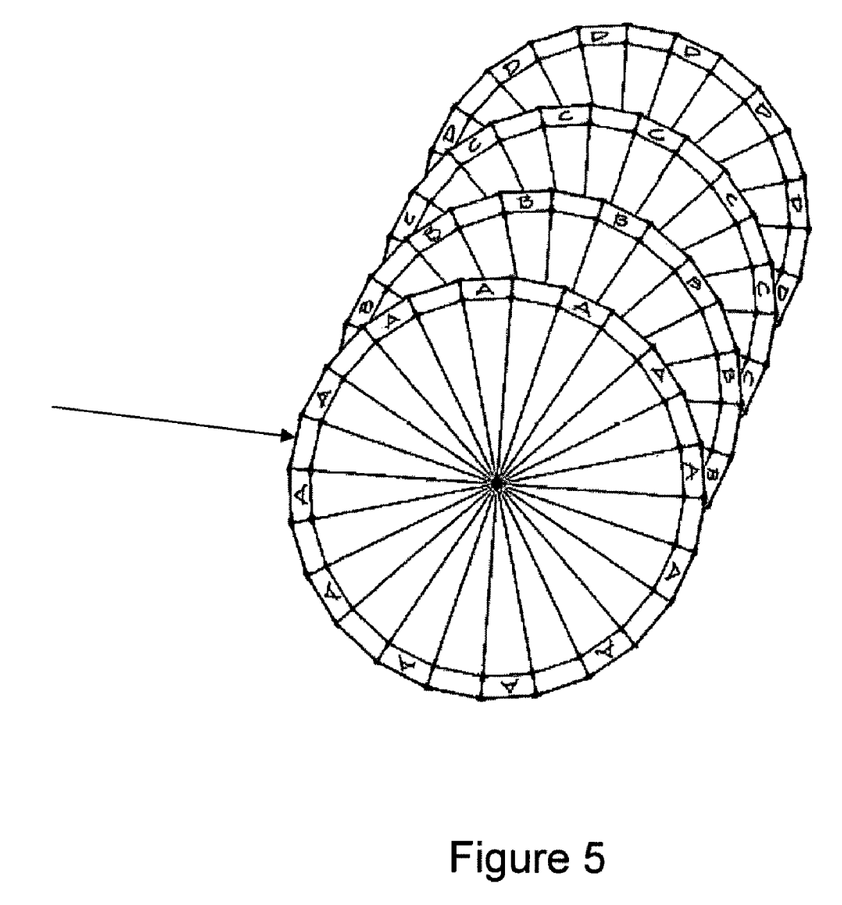
FIG. 5 shows a variety of markers that can be used.

FIG. 5 shows different sets of markers that can be used for this application. A set of markers may be distinguished from anther set of markers by the pattern shown on the markers, by the color shown of the markers, by the pattern and the color shown the markers, by multiple colors shown on the markers, or a combination of the above schemes.

Figure 6:
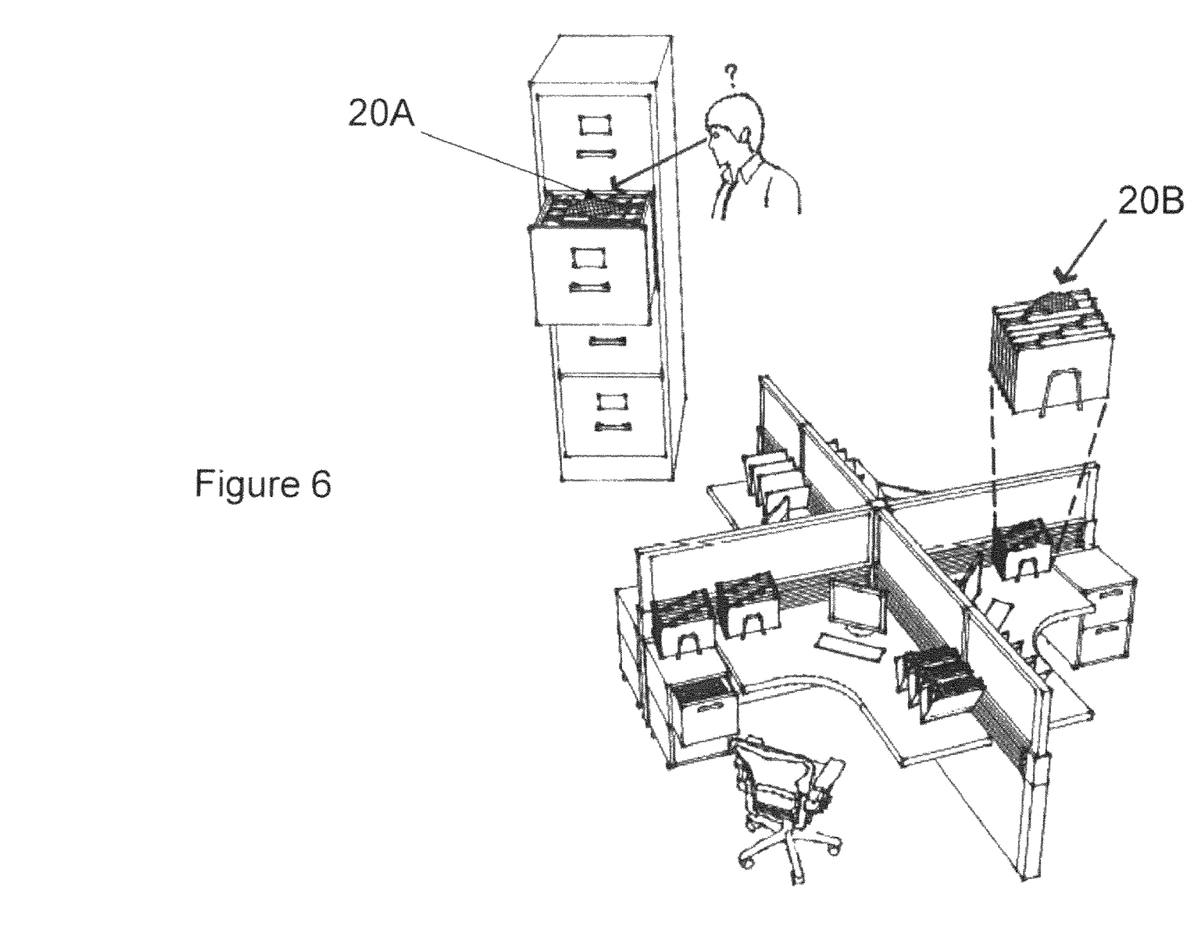
FIG. 6 shows how a matching marker can identify a file folder being removed and how it can be placed back into the file container.

FIG. 6 shows how a person can find a missing file folder 22. First, he looks into file container 26 of file cabinet 28 and finds a file folder 22 is missing. He recognizes the marker 20A. He looks around the office and finds a matching marker 20B on a desk on the office. He takes the file folder 22 from the desk, goes back to the file container 26, returns the file folder 22 to the file container 26 and removes the marker 20A from the file container. He has returned the file folder 22 to the original location. He can use this same method to return the file contents to the original location. He can use this method to find files and contents that are outside the file cabinet and are being used by others by looking for the matching marker around in the office.

Figure 7:
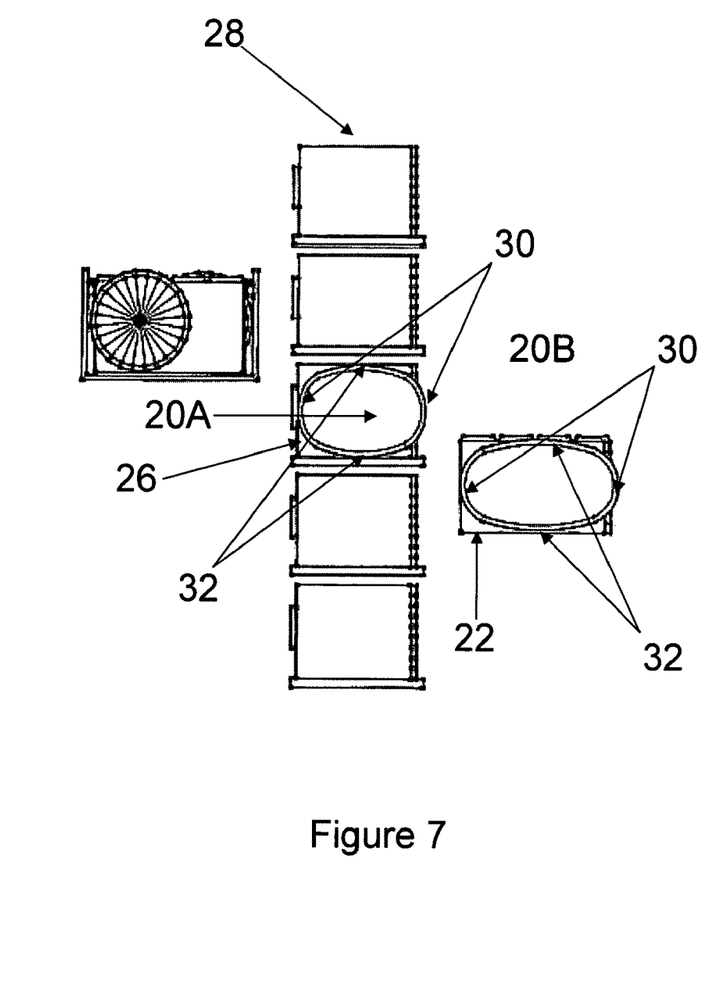
FIG. 7 shows how the oval markers can be used for vertical file containers.

For file containers that are vertical, the marker and the matching marker are of substantially oval shape. The marker has two slightly curved edges and two substantially curved edges. FIG. 7 shows a vertical cabinet with five file containers. The marker is long enough so that one of its substantially curved edge sticks slightly out of the file container 26 as shown in FIG. 7.

While the embodiments of the present invention have been described, it should be understood that various changes, adaptations, and modifications may be made therein without departing from the spirit of the invention and the scope of the claims.

What is claimed is:

1. A method of filing a file folder, comprising:
   removing a file folder from a file container;
   placing a marker inside the file container where said file folder was located;
   placing a matching marker inside the file folder;
   filing the file folder in the file container where the marker was located; and
   removing the marker and the matching marker from the file container.

2. The method of claim 1, where the marker is substantially circular in shape having a diameter being sized so that the diameter is tall enough to be seen behind tabs of other surrounding file folders.

3. The method of claim 1, where the marker is substantially circular in shape whereby the marker can be easily rolled around inside a file container when pushed by a user.

4. The method of claim 1, where the marker is substantially circular in shape having a diameter being sized so that the diameter is short enough that the file container can be closed inside a file cabinet.

5. The method of claim 1, where the marker is substantially circular in shape having a diameter being sized so that the diameter is tall enough to be seen behind tabs of other surrounding file folders and short enough that the file container can be closed inside a file cabinet.

6. The method of claim 1, where the marker is substantially oval in shape, having two slightly curved edges and two substantially curved edges and the marker is long enough so that one of the curved edge sticking slightly out of the file container.

7. The method of claim 1, where the marker and the matching marker are of the same size.

8. The method of claim 1, where the marker and the matching marker, each having a face on one side and a face on the opposite side, comprise the same pattern on a face of the marker and the matching marker.

9. The method of claim 1, where the marker and the matching marker, each having a face on one side and a face on the opposite side, comprise the same pattern on the two faces of the marker and the matching marker.

10. A method of filing a document back to a file folder, comprising:
    removing a document from a file folder;
    placing a marker inside the file folder where the document was located;
    attaching a matching marker with the document;
    filing said document back to the file folder where the marker was located; and
    removing the marker from the file folder and de-attaching the matching marker from said document.

11. A method of filing a missing file folder back to a file container, comprising:
    noticing the missing file folder and a marker in a file container;
    looking for a matching marker and the missing file folder;
    finding a matching marker and the missing file folder;
    filing the missing file folder back to the file container where the marker was located; and
    removing the marker from the file container and the matching marker from the file folder.

12. A kit to aid in filing a file folder back to a file container, comprising:
    a marker being placed in the file container, after the file folder has been removed; and
    a matching marker being placed in the removed file folder, whereby the marker and the matching marker are used to identify the removed file folder; and the removed file folder being filed back to the file container after finishing usage of the file folder.

13. The kit of claim 12, where the marker is substantially circular in shape having a diameter being sized so that the diameter is tall enough to be seen behind tabs of other surrounding file folders.

14. The kit of claim 12, where the marker is substantially circular in shape whereby the marker can be easily rolled around inside a file container when pushed by a user.

15. The kit of claim 12, where the marker is substantially oval in shape, having two slightly curved edges and two substantially curved edges and the marker is long enough whereby one of the curved edge sticking slightly out of the file container.

* * * * *